Patented Feb. 12, 1935

1,990,903

UNITED STATES PATENT OFFICE 1,990,903

DENTURE

Frazier Groff, Charleston, W. Va., assignor to Carbide and Carbon Chemicals Corporation, a corporation of New York No Drawing. Application December 27, 1932, Serial No. 648,848

14 Claims. (Cl. 106—22)

This invention relates to dentures, and includes new denture forming compositions and processes of making them as well as the improved dentures.

A material to form satisfactory dentures must possess certain definite characteristics dictated by the conditions under which dentures are used and by the technique of mechanical dentistry. A satisfactory denture material must be rigid at mouth temperatures, that is, at 98° F. and slightly higher. It must, at body temperatures, resist water and mouth fluids as well as weak acids, such as those occurring in mouth fluids, foodstuffs, beverages, etc., and alcohol and alkalies. It must be tough and mechanically strong. The denture material must be a poor conductor of heat but it must be usable in conjunction with metal grids or inserts to make possible regulated heat transfer through the denture to mouth tissue. It is essential that the denture possess a low coefficient of expansion. The color of the denture or denture material must be substantially unaffected by diffused sunlight, and its color should appear the same in both natural and artificial light. The denture material itself should be colorless or very nearly so in order that it can be modified to the desired shade of color and degree of translucency and brilliancy. It must not contain substances which irritate mouth tissue and the denture material itself must not be irritating to living tissue. It should be stable under molding conditions and to heat generally, and should be moldable under those conditions of pressure and temperature which are readily attained in plaster molds and the usual dental equipment. The denture material should not shrink appreciably upon molding and it must possess good flow and wetting properties in order that it may be molded over inserts, such as artificial teeth and metallic reenforcements, without inducing warpage or strain in the molded denture. The denture material must be capable of accurately receiving the impression of the mold and must have no tendency to unmold. Furthermore, the denture material must be uniform in strength and with respect to all of its properties.

Many substances have been proposed as denture forming materials, but all of them thus far known lack or are deficient in one or more of the above essential properties of suitable denture materials. I have discovered that the most satisfactory material thus far available is a special form of vinyl resin, that is, a resinous product resulting from the polymerization of certain vinyl compounds.

The principal object of my invention is to provide improved dentures and denture forming materials comprising vinyl resin. Another object is to provide processes for making improved denture forming materials. A further object is to provide improved denture blanks.

I am enabled to attain the objects of the invention and to make denture materials and dentures which possess all of the requisites set forth above to a remarkable degree by the use of particular forms of vinyl resins.

Vinyl resins may be made by polymerizing various vinyl esters, and it has been discovered that resins made by the conjoint polymerization (by which is meant the polymerization while in mutual contact) of two or more vinyl esters are greatly different from and represent improvement over the polymers of individual vinyl esters. Resins made by the conjoint polymerization of a vinyl halide, such as vinyl chloride, and a vinyl ester of an aliphatic acid, such as vinyl acetate, propionate, butyrate, etc., are particularly useful. I prefer to use conjoint polymerization products of vinyl halides and vinyl esters of aliphatic acids which contain from about 75% to about 95% by weight of the vinyl halide. Within this group of resins, I have found the best are those formed by conjointly polymerizing vinyl chloride and vinyl acetate in the proportions of about 84% to about 90% by weight of the chloride, and about 87% chloride is here preferred. These vinyl resins may be made by known methods, and a preferred method comprises conducting the polymerization at temperatures below about 60° C., and preferably below about 40° C. Liquid media or diluents may be present during polymerization, and such media should be non-solvents or relatively poor solvents for the vinyl resins. Examples of suitable media are aliphatic hydrocarbons, aliphatic alcohols and aliphatic ketones.

Ordinary vinyl resins prepared by the conjoint polymerization, for example of vinyl chloride and vinyl acetate, contain a mixture of polymeric substances of differing degree of molecular aggregation. The lower molecular weight vinyl polymers have comparatively low and sharp melting points and are more nearly crystalline bodies than the higher molecular weight vinyl polymers which may not melt at all without decomposition or which do not have sharp melting points. The lower molecular weight vinyl polymers are less stable to heat and light than are the high molecular weight polymers. In such ordinary polymerization products are contained, besides vinyl resins of varying molecular weight, small quantities of impurities and unpolymerized vinyl compounds. Unpolymerized vinyl acetate, for example, is irritating to mouth tissues, and when in contact with alkaline bodies changes color forming a highly colored yellow to red material.

In order to produce suitable denture forming resins from an ordinary product of conjoint polymerization containing polymers of varying molecular weight, unpolymerized vinyl esters, and other impurities, special purification methods involving the use of non-ferrous equipment and repeated precipitation of the resin to eliminate unpolymerized material and low molecular weight resin and to extract the thus purified resin to its final form is required. This treatment preferably includes repeated extraction and precipitation of the resin with chemically pure toluene at room temperature to remove toluene-soluble polymers which are the low molecular weight and the less water resistant polymers, and to eliminate all other impurities. The purification may be any treatment comprising precipitation or partial precipitation of the resin from solution and extraction with a partial solvent to remove soluble impurities, and filtration of a solution of the treated resin to remove insoluble impurities. Partial solvents are those which are non-solvents for the greater part of the resin, such as toluene, xylene, and solvent mixtures, such as water and acetone, isopropanol and acetone, etc. By this method it has been found that a very uniform material can be produced. The product has a good mechanical strength and, what is very important, is resistant to distortion. The uniqueness of this resistance to distortion is shown by the fact that the resin resists distortion even above its softening point, for example, if the material may be distorted when heated to 62° C. and the material may be molded free from strains at about 125° C., a piece of the resin which is freed from strains, for example, which has been molded at 125° C. or above, may be bent into a U shape at a temperature between the heat distortion point, 62° C., and the strain free molding temperature, 125° C. The resin will retain its bent form if it is cooled to below and kept at a temperature below its heat distortion point. However, if the bent piece is again heated to a temperature above its heat distortion point it will revert to its original shape and the strains set up within the material in effecting the distortion will be relieved. This unique property contributes greatly to the usefulness of the resin in forming dentures and is enhanced by freeing the resin from the modifying effects of low molecular weight polymers. Also, since the purified resin is free from low molecular weight and from less water resistant polymers its strength is increased and there is no tendency for the resin to become brittle with age. This latter effect may be produced in some vinyl resins by the presence of unpolymerized vinyl ester in the resin. For instance, vinyl acetate in its monomeric form is a solvent for the resin and as such its presence is not noticeable, but upon standing it polymerizes and causes the resin to become brittle.

The product of the polymerization process is usually obtained as a solution of the vinyl resin, for example in acetone. This solution is then treated to obtain a purified substantially uniform resin which is the basis of the denture forming material. The purification methods employed are of utmost importance, and in general comprise precipitation or fractional precipitation and redissolution of the resin a number of times to free it from the most easily removable impurities, such as unpolymerized vinyl compounds and certain inorganic impurities. The resin is then extracted with a solvent, such as toluene, which does not appreciably dissolve the desired fractions, and is reprecipitated and washed. The resin also may be dissolved before or after extraction and the solution filtered to remove lower polymeric forms and less water resistant fractions of the resin or insoluble impurities. In the fractional precipitation of the resin it is important to control the precipitation so that a gel or semi-solid mass is obtained rather than complete precipitation of the resin, except of course, in the final precipitation when the resin is to be dried. This precaution is necessary to prevent mechanical separation with the resin of impurities which ordinarily would remain in solution, and to prevent precipitation of the lower or more soluble resin fractions. It is advantageous to use a precipitating medium which is also a partial solvent for the resin as an aid in accomplishing the above result.

The following specific examples illustrate methods of practicing the production of a vinyl resin suitable for forming dentures:

I. Vinyl acetate and vinyl chloride were polymerized in the presence of acetone with dibenzoyl peroxide as a catalyst, and a solution of resin in acetone was obtained. The resin contained about 85% by weight of vinyl chloride, and the amount thereof was 100 parts by weight in 300 parts by weight in acetone. Isopropanol was added to the solution until "graining" of the resin occurred and a sloppy gel was precipitated. This required 90 parts by weight of the alcohol. The liquid was then decanted and the gel dissolved in 100 parts by weight of acetone. This precipitation and redissolution was repeated five times. In each case 100 parts by weight of acetone were used to redissolve the gel and the amounts of isopropanol required to precipitate the gel were 40, 60, 30, 50 and 50 parts by weight respectively. After the last precipitation of the gel and decantation of the liquid, 300 parts by weight of acetone were added to produce a smooth solution of the resin. This solution was then filtered. Filter aids, such as various types of silica or other mineral powders, may be used in this operation. The resin obtained may be used as such, or it may be further purified by extraction. A toluene extraction process will be described in the following example. If the resin after filtration is to be used without additional extractions it is precipitated, washed with water to remove precipitating solvents and dried in a vacuum drier at 45° to 50° C. to a solids content of 95%. It is then dried in an air drier at 45° to 50° C. to a solids content at 99% and is ready for use.

II. A resin solution obtained as described in Example I and consisting of 100 parts by weight of vinyl resin dissolved in 400 parts of acetone was treated by adding slowly thereto a mixture of acetone and water containing 30% water. Sufficient acetone-water mixture was added to cause the formation and separation of a soft sloppy gel. this quantity was 30 parts by weight. The liquids were decanted, and 175 parts of acetone were added to redissolve the gel. The resin was reprecipitated and redissolved 3 more times exactly as described. After the last addition of acetone to dissolve the gel, the resin was precipitated by diluting with 90 parts by weight of a mixture of isopropanol and acetone containing 70% of acetone and then adding slowly 60 parts of isopropanol. The precipitated resin was washed with 120 parts of isopropanol to remove the last traces of water and most of the acetone, and was then ready for the toluene extraction.

350 parts by weight of toluene were added to the resin and the whole was agitated for 2 hours. It was found that the resin was largely dissolved by the toluene due to the presence of residual acetone. This was corrected by adding 60 parts of isopropanol to precipitate the resin, after which all of the liquids were removed leaving a heavy gel. The resin was extracted twice more by agitating it for ½ hour with 100 and 150 parts by weight respectively of toluene. After the final extraction the resin was washed twice with isopropanol to remove the toluene, and dissolved in 300 parts of acetone, and this solution was filtered. The resin was precipitated by adding isopropanol and it was washed with isopropanol and with water and dried as in Example I.

The purified and extracted resin made according to Example I or II is tough, clear and substantially water-white and is suitable for making denatures of superior quality when modified as to color and opacity and formed into blanks. Vinyl resins other than the particular products described in the examples may be treated by substantially the same processes for this purpose, but such treatment is virtually essential. Even the best types of vinyl resins heretofore used for other purposes are not practically suited for use in denture forming material without purification similar to that described above, and attempts to make useful dentures with untreated and unpurified vinyl resins have been uniformly unsuccessful.

The vinyl resins used in making the dentures of this invention are unlike those heretofore known for any purpose, and most nearly possess the properties of an ideal denture as above set forth. They are free from unpolymerized material, low molecular weight and toluene-soluble polymers, catalytic residues, metallic impurities and the like. Also, the vinyl resins of my invention are characterized by toughness, resistance to distortion, low water absorption, poor heat conductivity, good flow in molding and over inserts, resistance to conditions of heat and cold, chemical inertness, and brilliant coloring qualities.

The vinyl resin base of the denture material may be rendered still more stable to light and heat by adding neutral calcium stearate thereto, or a mixture of neutral calcium stearate and a wax, such as carnauba wax, may be added to stabilize the resin and improve its molding qualities. If additional stability to heat is desired, the stabilizing addition may be made alkaline with hydrated lime.

Modifying agents, such as chlorinated diphenyl derivatives, chlorinated naphthalene, ethyl abietate, natural resins, polymerized aldehyde resins, polymeric glycol esters, and the like may be added to the vinyl resin compositions to control the plasticity and softening point of the product. The addition of the more highly chlorinated naphthalenes increases the hardness of the material, decreases its coefficient of friction and increases the light stability of the product.

It is sometimes desirable to add small amounts of very finely ground silica or other inert transparent or translucent filling materials to increase the surface hardness of the denture. In general, from about 5% to 10% filler based on the weight of vinyl resin is the maximum which should be used.

The color of dentures is an especially important feature. In this connection vinyl resin denture material has important and valuable properties. It is very clear and brilliant, making it possible to obtain desired color shades and degrees of brilliancy and translucency. Chemically pure titanium oxide is preferred as an opacifying pigment. Colors, such as lithol red, toluidine toner, rhodamine B base, quinoline yellow base, oil reds, etc., may be used to obtain the color shades. The preferred colors are those which are water insoluble, but water soluble coloring materials may be used if desired. Dentures made as herein described are substantially unaffected by diffused sunlight, and this property enables them to retain any desired shade of coloring.

The vinyl resin denture material when compounded and colored as desired is most conveniently supplied and made into the finished denture in the form of denture blanks or molded preforms. I have discovered that a departure from the usual form of denture blank or preform facilitates the final molding of my improved dentures. I prefer to make the blanks with a cross-sectional form which will cause a maximum flow of material when it is thereafter molded. This is contrary to the usual form of such blanks which are customarily preformed to approximate as closely as possible the form of the finished dentures, thus allowing but a minimum of flow when molded.

An important characteristic of this denture is its moldability. The vinyl resins are not affected by paraffin, mineral oil, triethanolamine, turpentine, or water, and these materials may be used as heating media in the usual autoclave technique for pressing dentures. Vinyl resin dentures may be repeatedly remolded in the course of normal repair. The thermoplasticity of this denture material is such as to permit dentures formed therefrom to be repaired without remolding the whole denture, for example, a tooth may be removed with dental tools, replaced by a new tooth, a quantity of vinyl resin denture material added and fluxed with a hot tool. Dry molding, as ordinarily employed in the plastic industry, may be substituted throughout for the autoclave method using fluid heat transfer media, if desired.

For certain purposes dentures may be reinforced, particularly in the case of partial dentures, and such reinforcement is generally a delicate metal part. The denture material of this invention is characterized by its free flowing properties permitting it to cover completely and to seal over metallic inserts. This is very essential since exposed metal portions of dentures tend to cause unpleasant effects in the mouth.

Composites containing vinyl resins and other denture materials may be formed. In general, ordinary dentures may be improved by surfacing them with vinyl resin compositions. Adherence may be effected by mechanical means, due to the accuracy with which vinyl resins may be molded, and by chemical means, due to partial solubility, dependent upon the particular material used. The vinyl resin compositions shrink upon molding to a very small extent, hence it is sometimes desirable to adopt other expedients to secure adequate anchorage of the teeth in the denture. This may be done by any convenient means. For example, the porcelain teeth may be roughened on the portion thereof which is to be embedded in the vinyl resin. Also, the teeth may be coated with a solution of a resin which is thermosetting and which shrinks considerably to which the vinyl resin will adhere due to partial solubility of the second resin in the vinyl resin. Examples of such materials are resins of the phenol-formaldehyde type or alkyd resins of the glycerol-phthalic anhydride type. These resins are thermo-reactive, and should be cured or reacted before the denture is molded. Both of these thermosetting resins are suitable, particularly the alkyd resins which shrink very appreciably when reacted.

Vinyl resin dentures when molded by the autoclave method using water or steam as a heating medium may exhibit a water blush on the finished article. Such dentures may be deblushed, when dried, by reheating the surface superficially. For example, deblushing may be accomplished by dipping the denture in boiling water, or by applying hot oil to the surface of the denture in a quantity merely sufficient to heat the surface.

I claim:—

1. Denture comprising a vinyl resin substantially identical with a resin resulting from the conjoint polymerization of a vinyl halide and a vinyl ester of an aliphatic acid and which contains from about 75% to about 95% by weight of the vinyl halide, said vinyl resin being substantially free from unpolymerized material, low molecular weight and toluene-soluble polymers, catalytic residues and metallic impurities.

2. Denture comprising a vinyl resin substantially identical with a resin resulting from the conjoint polymerization of a vinyl halide and a vinyl ester of an aliphatic acid and which contains from about 84% to about 90% by weight of the vinyl halide, said vinyl resin being substantially free from unpolymerized material, low molecular weight and toluene-soluble polymers, catalytic residues and metallic impurities.

3. Denture comprising a vinyl resin substantially identical with a resin resulting from the conjoint polymerization of vinyl chloride and a vinyl ester of an aliphatic acid and which contains from about 84% to about 90% by weight of the vinyl chloride, said vinyl resin being substantially free from unpolymerized material, low molecular weight and toluene-soluble polymers, catalytic residues and metallic impurities.

4. Denture comprising a vinyl resin substantially identical with a resin resulting from the conjoint polymerization of vinyl chloride and vinyl acetate and which contains from about 84% to about 90% by weight of the vinyl chloride, said vinyl resin being substantially free from unpolymerized material, low molecular weight and toluene-soluble polymers, catalytic residues and metallic impurities.

5. Denture having at least its outer surface formed of a composition comprising essentially a vinyl resin substantially identical with a resin resulting from the conjoint polymerization of a vinyl halide and a vinyl ester of an aliphatic acid and which contains from about 75% to about 95% by weight of the vinyl halide, said vinyl resin being substantially free from unpolymerized material, low molecular weight and toluene-soluble polymers, catalytic residues and metallic impurities, and said denture being characterized by resistance to mouth fluids, beverages, foodstuffs and cleansing materials, the absence of tendencies to warp and shrink, a smooth even surface finish, total lack of irritating effects on mouth tissues, and a depth and shade of color closely simulating the natural color of human gum and mouth tissues, and which presents the same appearance under natural and artificial light.

6. Denture having at least its outer surface formed of a composition comprising essentially a vinyl resin substantially identical with a resin resulting from the conjoint polymerization of vinyl chloride and vinyl acetate and which contains from about 75% to about 95% by weight of the vinyl chloride, said vinyl resin being substantially free from unpolymerized material, low molecular weight and toluene-soluble polymers, catalytic residues and metallic impurities, and said denture being characterized by resistance to mouth fluids, beverages, foodstuffs and cleansing materials, the absence of tendencies to warp and shrink, a smooth even surface finish, total lack of irritating effects on mouth tissues, and a depth and shade of color closely simulating the natural color of human gum and mouth tissues, and which presents the same appearance under natural and artificial light.

7. A moldable composition useful for forming dentures which comprises a major proportion of a vinyl resin together with a stabilizing material for said vinyl resin and a coloring material which imparts to said composition when molded a depth and shade of color closely simulating the natural color of human mouth and gum tissues, said vinyl resin being substantially identical with a resin resulting from the conjoint polymerization of a vinyl halide and a vinyl ester of aliphatic acid and containing from about 75% to about 95% of the vinyl halide, and being substantially free from unpolymerized material, low molecular weight and toluene-soluble polymers, catalytic residues, and metallic impurities.

8. A moldable composition useful for forming dentures which comprises a major proportion of a vinyl resin together with a stabilizing material for said vinyl resin and a coloring material which imparts to said composition when molded a depth and shade of color closely simulating the natural color of human mouth and gum tissues, said vinyl resin being substantially identical with a resin resulting from the conjoint polymerization of vinyl chloride and vinyl acetate and containing from about 75% to about 95% of the vinyl chloride, and being substantially free from unpolymerized material, low molecular weight and toluene-soluble polymers, catalytic residues, and metallic impurities.

9. Process for making vinyl resin compositions suitable for forming dentures which comprises making a solution by dissolving a vinyl resin substantially identical with a resin resulting from the conjoint polymerization of a vinyl halide and a vinyl ester of an aliphatic acid and which contains from about 75% to about 95% of vinyl halide; partially precipitating said vinyl resin from said solution by means of a partial solvent for the resin to extract therefrom soluble impurities including a portion of the original vinyl resin; filtering a solution of the resin remaining after said partial precipitation to remove insoluble impurities therefrom; and thereafter precipitating the vinyl resin from the filtered solution, and drying the precipitated resin.

10. Process for making vinyl resin compositions suitable for forming dentures which comprises making a solution by dissolving a vinyl resin substantially identical with a resin resulting from the conjoint polymerization of vinyl chloride and vinyl acetate and which contains from about 75% to about 95% of vinyl chloride; partially precipitating said vinyl resin from said solution by means of a partial solvent for the resin to extract therefrom soluble impurities including a portion of the original vinyl resin; filtering a solution of the resin remaining after said partial precipitation to remove insoluble impurities therefrom; and thereafter precipitating the vinyl resin from the filtered solution, and drying the precipitated resin.

11. Process for making vinyl resin compositions suitable for forming dentures which comprises making a solution by dissolving a vinyl resin substantially identical with a resin resulting from the conjoint polymerization of a vinyl halide and a vinyl ester of an aliphatic acid and which contains from about 84% to about 90% of vinyl halide; partially precipitating said vinyl resin from said solution by means of a partial solvent for the resin to extract therefrom soluble impurities including a portion of the original vinyl resin; filtering a solution of the resin remaining after said partial precipitation to remove insoluble impurities therefrom; and thereafter precipitating the vinyl resin from the filtered solution, and drying the precipitated resin.

12. Process for making vinyl resin compositions suitable for forming dentures which comprises making a solution by dissolving a vinyl resin substantially identical with a resin resulting from the conjoint polymerization of a vinyl halide and a vinyl ester of an aliphatic acid and which contains from about 75% to about 95% of vinyl halide; partially precipitating said vinyl resin from said solution by means of a partial solvent for the resin to extract therefrom soluble impurities including a portion of the original vinyl resin; extracting the resin remaining after said partial precipitation with a partial solvent to remove additional soluble impurities; filtering a solution of the resin remaining after said extraction to remove insoluble impurities therefrom; and thereafter precipitating the vinyl resin from the filtered solution, and drying the precipitated resin.

13. Process for making vinyl resin compositions suitable for forming dentures which comprises making a solution by dissolving a vinyl resin substantially identical with a resin resulting from the conjoint polymerization of vinyl chloride and vinyl acetate and which contains from about 75% to about 95% of vinyl chloride; partially precipitating said vinyl resin from said solution by means of a partial solvent for the resin to extract therefrom soluble impurities including a portion of the original vinyl resin; extracting the resin remaining after said partial precipitation with a partial solvent to remove additional soluble impurities; filtering a solution of the resin remaining after said extraction to remove insoluble impurities therefrom; and thereafter precipitating the vinyl resin from the filtered solution, and drying the precipitated resin.

14. Process for making vinyl resin compositions suitable for forming dentures which comprises making a solution by dissolving a vinyl resin substantially identical with a resin resulting from the conjoint polymerization of vinyl chloride and vinyl acetate and which contains from about 84% to about 90% of vinyl chloride; partially precipitating said vinyl resin from said solution by means of a partial solvent for the resin to extract therefrom soluble impurities including a portion of the original vinyl resin; extracting the resin remaining after said partial precipitation with toluene to remove additional soluble impurities; filtering a solution of the resin remaining after said extraction to remove insoluble impurities therefrom; and thereafter precipitating the vinyl resin from the filtered solution, and drying the precipitated resin.

FRAZIER GROFF.